Nov. 20, 1962     C. F. DOERFLER     3,064,838
BOAT ALIGNER
Filed April 30, 1959
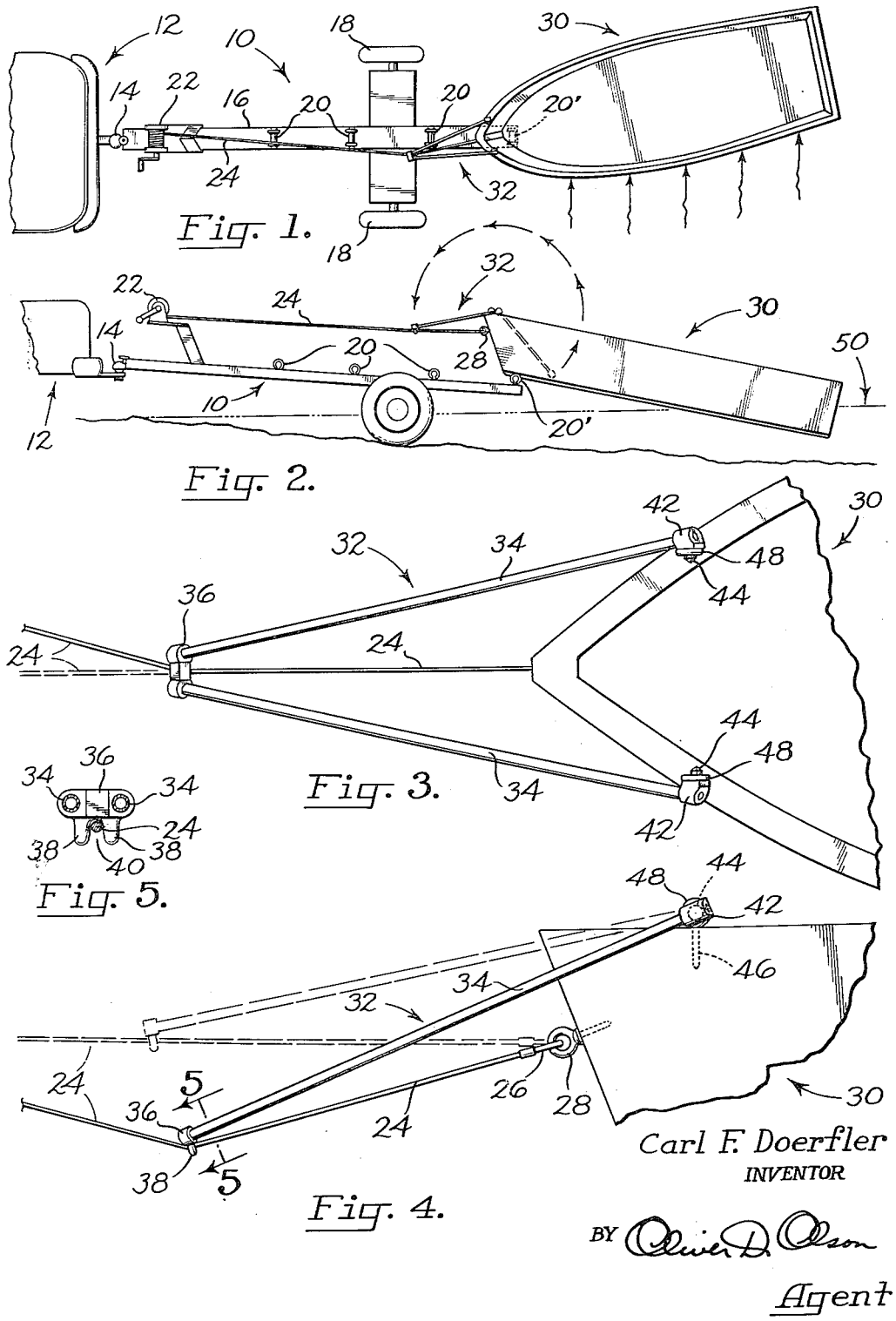
Carl F. Doerfler
INVENTOR
BY Oliver D. Olson
Agent United States Patent Office 3,064,838
Patented Nov. 20, 1962

3,064,838
BOAT ALIGNER
Carl F. Doerfler, 1165 Hines St., Salem, Oreg.
Filed Apr. 30, 1959, Ser. No. 810,017
5 Claims. (Cl. 214—84)

This invention pertains to the loading and unloading of boats relative to trailers, and relates particularly to a boat aligner which functions to align and maintain in alignment a trailer and boat during loading and unloading of the latter.

The loading and unloading of boats from trailers generally is accomplished by use of a cable extending from a winch located at the forward end of the trailer, with the free end of the cable anchored in an eye projecting from the bow of the boat. The trailer generally is provided with a plurality of keel guide rollers or other means arranged on the longitudinal centerline of the trailer for maintaining the longitudinal axis of the boat in line with the longitudinal axis of the trailer. However, when the boat is displaced rearwardly from the trailer in a position unsupported by the keel guide rollers, the stern of the boat is free to swing laterally with respect to the longitudinal axis of the trailer, when influenced by some external force such as high winds or cross currents of water. This is the sort of difficulty often encountered during the loading from and unloading into a relatively swift running body of water, since the longitudinal axis of the trailer generally is disposed substantially normal to the current.

When the contour of the bank of a body of swift running water permits it, the boat trailer may be substantially submerged in the water to permit the more skilled boat operators to drive the boat onto the trailer, when loading. However, under most conditions and for most boat operators, the loading of a boat onto a trailer from a swift running current heretofore has required that a person wade into the water and physically push or pull the stern in the direction to align the boat with the trailer, and to maintain such alignment as the cable is wound in and the boat drawn onto the trailer. This procedure requires the participation of a minimum of two persons. Moreover, this procedure must often be used also for the unloading of a boat, for unless the stern is held against lateral displacement from the trailer axis as the stern is laid into the water, the boat may be tipped from the trailer or substantial damage inflicted upon the keel.

It is a principal object of the present invention to provide a boat aligner which functions automatically to align a boat and trailer and to maintain such alignment during loading and unloading of the boat from and into a cross current body of water.

Another important object of this invention is the provision of a boat aligner which functions in the manner above described to accommodate the loading and unloading of a boat by a single person.

Still another important object of this invention is to provide a boat aligner which functions in the manner above described automatically through the normal operation of a conventional trailer cable winch.

A further important object of the present invention is the provision of a boat aligner which is of simplified construction for economical manufacture and which is capable of mounting upon a boat with a minimum of complication.

The foregoing and other objects and advantages of this invention will appear from the following detailed description, taken in connection with the accompanying drawing, in which:

FIG. 1 is a plan view of a boat and boat trailer illustrating the function of a boat aligner embodying the features of this invention, the direction of water current being depicted by wavy arrow lines;

FIG. 2 is a view in side elevation of the assembly shown in FIG. 1, the boat aligner being shown by dash lines in retracted position;

FIG. 3 is a fragmentary plan view showing a construction of a boat aligner embodying the features of the present invention;

FIG. 4 is a fragmentary view in side elevation of the boat aligner shown in FIG. 3; and FIG. 5 is a sectional view taken along the line 5—5 in FIG. 4.

Referring first to FIGS. 1 and 2 of the drawings, there is shown for illustration a boat trailer 10 supported at its forward end on a towing vehicle 12 by means of a conventional trailer hitch 14. The longitudinal frame 16 of the trailer is supported upon laterally spaced traction wheels 18, in conventional manner. The longitudinal frame of the trailer supports a plurality of longitudinally spaced keel guide rollers 20, arranged along the longitudinal centerline of the trailer. A cable winch 22 is mounted upon the longitudinal frame of the trailer adjacent the forward end of the latter, and carries a cable 24 secured thereto at one of its ends. The free end of the cable is provided with a hook 26 (FIG. 4) proportioned for releasable engagement in the eye 28 of a cable anchor eye screw, the shank of which is secured in the bow of a boat 30 and projects forwardly therefrom.

The boat aligner 32 of this invention comprises an elongated structural member provided at its forward end with a cable guide and adapted to be mounted at its rearward end on the end of the boat carrying the cable anchor eye 28. In the arrangement illustrated in the drawing, the cable anchor eye is mounted in the bow of the boat, and hence the boat aligner is adapted to be mounted at the bow. This mounting of the boat aligner is made in such manner that the cable guide means at the forward end of the aligner is maintained substantially on the vertical plane passing through the longitudinal center line of the boat and the cable anchor eye.

In the preferred embodiment best illustrated in FIGS. 3, 4 and 5, the boat aligner 32 includes a pair of elongated hollow rods 34 which converge forwardly and are interconnected at their forward ends by the cable guide member. In the illustrated embodiment, this guide member is in the form of a casting, and includes a main body 36 provided with a pair of laterally spaced openings for receiving the forward ends of the rods 34. The rods and body are secured together, either permanently as by a press fit or by welding, or detachably as by set screws or by interconnecting threads.

Cable guide means is provided on the casting body. In the embodiment illustrated, such guide means is provided by a pair of latreally spaced projections 38 formed integrally with the casting and extending therefrom in the downward direction when the boat aligner is disposed in the forwardly projecting operative position illustrated in FIG. 4. These projections form a guide groove 40 therebetween, dimensioned to slidably receive the winch cable 24.

Means is provided on the rearward ends of the elongated rods 34 for anchoring the same to a boat. In the embodiment illustrated, such means is provided in the form of a pair of pivot terminals, one for each rod. Each terminal comprises a main body 42 having an opening therein for receiving the rearward end of the rod 34, these elements being secured together, either permanently as by a press fit or by welding, or detachably as by set screws or by interengaging threads.

Each pivot terminal also is provided with a stub pivot shaft 44 projecting inwardly from the main body 42. In the preferred embodiment illustrated, the pivot terminal including the body and shaft is formed integrally, as by casting.

In the embodiment illustrated the pivot shafts are mounted releasably on the boat by means of a pair of eye screws, one associated with each pivot terminal. The threaded shank 46 of each eye screw is anchored firmly to the boat, as in the rails capping the sides of the boat. These eye screws are so positioned that the eyes 48 thereof are arranged on a common axis extending transversely of the boat substantially normal to the longitudinal axis of the boat.

The boat aligner thus is mounted on the boat by springing the diverging rearward ends of the rods 34 apart sufficiently to permit the stub shafts 44 to enter the eyes 48 of the eye screws. The natural resilience of the elongated rods urges the pivot terminals toward each other from the aforementioned sprung apart position, with sufficient force to retain the stub shafts within the eyes. However, the inner ends of the stub shafts may, if desired, be threaded to receive a lock nut, or may be apertured to receive a locking pin, to insure against accidental disengagement of the stub shafts from the eyes 48.

The boat aligner functions in the following manner: In loading the boat onto the trailer from a swift running cross current 50, the boat is propelled forward to the position at which the forward end of the keel is in the vicinity of the rearward most keel guide roller 20'. The boat motor may be employed to maintain this position until the operator has anchored the hook 26 of the winch cable 24 to the eye screw 28 on the bow. The operator then manipulates the forward end of the boat to engage the keel on the rearward keel guide roller 20', whereby to provide a point of pivot for the boat.

The boat aligner 32 then is swung from its retracted position shown in dash lines in FIG. 2, counterclockwise to the operative position projecting forwardly from the bow. The operator grasps the winch cable 24 and pulls it laterally and engages it in the guide groove 40 at the forward end of the aligner. Since the aligner is mounted pivotally at its rearward end, the forward end tends to rotate downwardly by gravity, thus maintaining the cable guide member engaged on the cable during all conditions of slackness in the cable.

The cable winch 22 now is manipulated to draw in the cable 24. As the cable becomes taut, it elevates from its slack condition and straightens to a substantially horizontal plane, as indicated in dash lines in FIG. 4, the aligner pivoting freely in the clockwise direction as the cable elevates.

As the cable is drawn in by manipulation of the winch, the tension developed in it by the weight of the boat, tends to straighten the cable also in a vertical plane (FIGS. 1 and 3). Thus, a force of leverage is applied by the tensioned cable to the forward end of the aligner, at the cable guide means 36. Since the boat is fulcrumed on the rearward keel guide roller 20', a substantial distance rearwardly of the cable guide means 36, the lateral force exerted by the tensioned cable is sufficient to swing the stern of the boat against the force of the flowing current, until the boat is aligned with the trailer. This alignment is maintained as the tensioned cable is drawn in and the boat pulled forwardly to its mounted position on the trailer.

It will be apparent that the reverse procedure is employed for unloading a boat into a swift running current, the tensioned cable serving to maintain alignment of the boat and trailer as the cable is payed out during launching.

From the foregoing it will be apparent that the present invention provides effective means by which to facilitate the loading and unloading of a boat by one person. The boat aligner is of simplified construction for economical manufacture, and is readily adapted for use with all types of boats. The aligner preferably is rendered detachable, as explained hereinbefore, for easy removal from a boat if desired. Alternatively, it may simply be rotated to a retracted position within the constricted area of the boat adjacent the bow.

It will be apparent to those skilled in the art that various changes and modifications may be made in the details of construction described hereinbefore. For example, the aligner may be constructed from a single length of rod or tubing bent intermediate its ends to provide a forward support for a cable guide means 36, 38 and bent inwardly at its rearward ends to provide the pivot shafts 44. Alternatively, the aligner may take the form of an elongated member mounted in a fixed, operative position, or the member may be supported for rectilinear extension and retraction as well as for pivotal movement in its operative position. Other modifications and changes may be made, as desired, without departing from the spirit of this invention and the scope of the appended claims.

Having now described my invention and the manner in which the same may be used, what I claim as new and desire to secure by Letters Patent is:

1. For use with a boat trailer having a power operated cable and boat keel guide means at its rearward end, and a boat having cable anchor means at one end located on the center line of the boat: boat aligner means comprising an elongated structural member, cable guide means on the forward end of the structural member adapted to slidably engage a boat trailer cable, support means adapted to be attached to and carried by a boat for mounting the structural member on the boat for movement of the cable guide means between a rearwardly retracted position and an operative position extended forwardly of the cable anchor means and substantially on the center line of the boat for engaging the cable.

2. The boat aligner of claim 1 wherein the cable guide means includes laterally spaced projections which extend downward when in operative position for straddling the cable, the structural member thereby being supported at its forward end on the cable.

3. The boat aligner of claim 1 wherein the mounting means includes pivot support means for mounting the structural member for pivotal movement on an axis substantially normal to the centerline of the boat.

4. The boat aligner of claim 1 wherein the elongated structural member is provided with laterally spaced rearward ends and the mounting means comprises a pair of laterally spaced pivot means mounted on the boat and adapted to pivotally support the rearward ends of the structural member.

5. For use with a boat trailer having a power operated cable and boat keel guide means at its rearward end, and a boat having cable anchor means at one end located on the center line of the boat: boat aligner means comprising a pair of elongated structural members connected together at their forward ends and diverging rearwardly, cable guide means on the forward end of the structural members, support means adapted to be attached to and carried by a boat, and pivot means mounting the rearward ends of the structural members on the support means for permitting movement of the cable guide means pivotally between a forwardly extended operative position and a rearwardly retracted position.

References Cited in the file of this patent

UNITED STATES PATENTS

| | | |
|---|---|---|
| 2,533,972 | Symonds et al. | Dec. 12, 1950 |
| 2,685,696 | Oscanyan | Aug. 10, 1954 |
| 2,821,315 | Bucher | Jan. 28, 1958 |
| 2,997,188 | Hauser | Aug. 22, 1961 |